United States Patent [19]

Pletz-Kirsch

[11] Patent Number: 5,053,869
[45] Date of Patent: Oct. 1, 1991

[54] DIGITAL CIRCUIT ARRANGEMENT DETECTING SYNCHRONIZING PULSES

[75] Inventor: Gerhard Pletz-Kirsch, Hamburg, Fed. Rep. of Germany

[73] Assignee: U.S. Philips Corporation, New York, N.Y.

[21] Appl. No.: 587,311

[22] Filed: Sep. 21, 1990

[30] Foreign Application Priority Data

Sep. 23, 1989 [DE] Fed. Rep. of Germany ....... 3931861

[51] Int. Cl.⁵ .............................................. H04N 5/08
[52] U.S. Cl. .................................... 358/153; 358/155
[58] Field of Search ............... 358/153, 154, 148, 174, 358/176, 155

[56] References Cited

U.S. PATENT DOCUMENTS

| | | | |
|---|---|---|---|
| 4,698,679 | 10/1987 | Balaban et al. | 358/153 |
| 4,707,740 | 11/1987 | Stratton | 358/153 |
| 4,858,008 | 8/1989 | Sieben | 358/153 X |
| 4,860,100 | 8/1989 | Rakhodai et al. | 358/153 X |
| 4,963,969 | 10/1990 | Kitaura et al. | 358/153 X |

Primary Examiner—Victor R. Kostak
Attorney, Agent, or Firm—Bernard Franzblau

[57] ABSTRACT

In a digital circuit for detecting horizontal or vertical synchronizing pulses in a digital video signal, the video signal is applied to a level detector which supplies an extreme value signal which indicates the level of the synchronizing pulse at the end of a time interval. The extreme value signal represents the extreme value of the signal which has hitherto occurred in a time interval equal the time between two consecutive synchronizing pulses. In each period between two consecutive synchronizing pulses a new time interval is started at a predetermined instant outside the blanking interval. In order to generate a comparison signal, the extreme value signal is continuously reduced by a predetermined amount. The comparison signal and the digital video signal delayed by several sample clock periods are applied to a comparator which supplies a synchronizing signal during those periods when amplitude level of the delayed digital video signal is higher than the level of the comparison signal.

14 Claims, 1 Drawing Sheet

DIGITAL CIRCUIT ARRANGEMENT DETECTING SYNCHRONIZING PULSES

BACKGROUND OF THE INVENTION

This invention relates to a digital circuit arrangement for detecting horizontal or vertical synchronising pulses in a digital video signal.

Known circuit arrangements for separating horizontal or vertical synchronising pulses from video signals use a separating circuit for the horizontal or vertical synchronising pulses and compare them with a clipping level obtained from the pulse amplitude. This clipping level is, however, always an average amplitude of the television signal, no matter what criteria are used. As a result, considerable problems arise in disturbed input signals (large noise component) in which the synchronising pulses can no longer be recognized unambiguously.

European Patent Application 244,239 discloses a separating circuit for synchronising pulses in which the edges of the synchronising pulses are detected. The signal then obtained is utilized to generate a clipping level. To detect the edges of the pulses in the video signal, assumptions about their edge steepness are required. If these criteria are no longer achieved, as is the case, for example, in a disturbed signal, either no synchronising pulse is detected or it may lead to erroneous detections.

SUMMARY OF THE INVENTION

It is an object of the invention to provide a circuit arrangement for detecting synchronising pulses in a video signal, ensuring a certain recognition of pulses, also in a disturbed video signal.

According to the invention, this object is solved in that the television signal is applied to a level detector which supplies an extreme value signal which continuously provides that extreme value of the video signal which has hitherto occurred in a time interval whose duration corresponds to the interval with respect to time between two consecutive synchronising pulses, which extreme value indicates the level of the synchronising pulse at the end of the time interval, in that a new time interval is started between consecutive synchronising pulses at a predetermined instant outside the blanking interval, and in that for generating a comparison signal the extreme value signal is continuously reduced by a predetermined amount and applied to a comparator which supplies a synchronising signal during those periods when the level of the video signal, delayed by several sample values, is higher than the level of the comparison signal.

The level detector continuously checks the level of the video signal in a time interval and establishes that extreme value of the signal which indicates the level of the synchronising pulse at the end of the time interval. In the case of a non-inverted video signal, the minimum values of the video signal should thus be taken into account. However, if the video signal is present in an inverted form, the maximum values are those extreme values in which the synchronising pulses occur. The level detector now continuously supplies an extreme value signal indicating the extreme value which has so far occurred in a time interval. Thus, it is known at any time which extreme value has so far occurred in the time interval which is just terminating.

The time intervals represent the duration of a picture line for a horizontal synchronisation and the duration of a field for a vertical synchronisation, but they are not started at their initial instant but at an instant outside the blanking interval of the video signal. This instant is predetermined and identical in each picture line.

A comparison signal is generated which is the extreme value signal but is reduced by a predetermined amount. This extreme value signal is applied to a comparator. The comparator now compares this extreme value signal with the video signal which is, however, delayed by several sample clocks. A synchronising signal is generated in those periods in which the level of the delayed video signal is higher than the level of the comparison signal. As a rule, this synchronising signal is applied to a phase control circuit following the digital circuit arrangement.

The circuit arrangement has the particular advantage that the extreme value of the level is separately determined for each synchronising period so that the signal need not be averaged and errors resulting from averaging do not occur. Particularly in the disturbed video signal the synchronising pulses are clearly better recognized in this way. Separation takes place for each blanking interval in the case of, for example, a too small level of the synchronising pulses, even when only a few synchronising pulses have a too low level, while the maximum level is determined and the synchronising pulses are recognized in this way, assuming that the synchronising pulses have the minimum or maximum level in a blanking interval.

In this circuit arrangement a separating circuit and an averaged amplitude measurement can be completely dispensed with. The extreme values of the overall video signal are determined, taking into account the minimum or maximum values of the signal, dependent on whether the video signal is present in a non-inverted or in an inverted form.

In a further embodiment of the invention the level detector is preceded by a low-pass filter. Particularly in the case of a video signal which is beset with noise, it is advantageous to provide such a low-pass filter in order that the detected extreme value of the signal is not determined by individual noise pulses.

According to a further embodiment of the invention the predetermined amount by which the extreme value signal is reduced to obtain the comparison signal is $\frac{1}{8}$ to 1/32, preferably 1/16.

It has been found to be advantageous to reduce the extreme value signal by an amount of 1/16 to generate the comparison signal because disturbing pulses are usually not yet noticeable at this value, but on the other hand an adequate level difference is provided so as to reliably obtain the desired level difference in those periods in which the video signal comprises synchronising pulses in the comparator, when comparing the comparison signal and the video signal which is delayed by several sample clocks.

According to a further embodiment of the invention the time intervals are started each time by the end of the active part, comprising the picture contents, of each picture line. In this way a possibly minimum amount of picture contents is comprised in the video signal from the starting instant of the time interval to the occurrence of a synchronising pulse, which video signal may have such a low level in extreme cases that a reliable recognition of the synchronising pulses is no longer possible.

According to a further embodiment of the invention the time intervals are started by means of a counter which is arranged in a digital phase control circuit following the circuit arrangement.

If a digital phase control circuit follows the circuit arrangement, it usually comprises a counter which, in the synchronised state of the phase control circuit, supplies a defined count at each instant of a picture line or a picture. Thus, a defined count which is then present in the counter can be detected at each desired instant and used for generating a signal to start the time intervals.

According to a further embodiment of the invention the video signal applied to the comparator is delayed by 10 to 30, preferably 20 sample clocks of the video signal.

The video signal applied to the comparator for comparison with the comparison signal is advantageously delayed by approximately 20 sample clocks because, on the one hand, adequate time has elapsed in this way so as to determine whether a higher extreme value of the signal still occurs and, on the other hand, whether the generated synchronising signal is not delayed too much with respect to the synchronising pulses.

BRIEF DESCRIPTION OF THE DRAWINGS

The invention will now be described in greater detail by way of example with reference to the accompanying drawings, in which.

DESCRIPTION OF THE PREFERRED EMBODIMENTS

Figure 1:
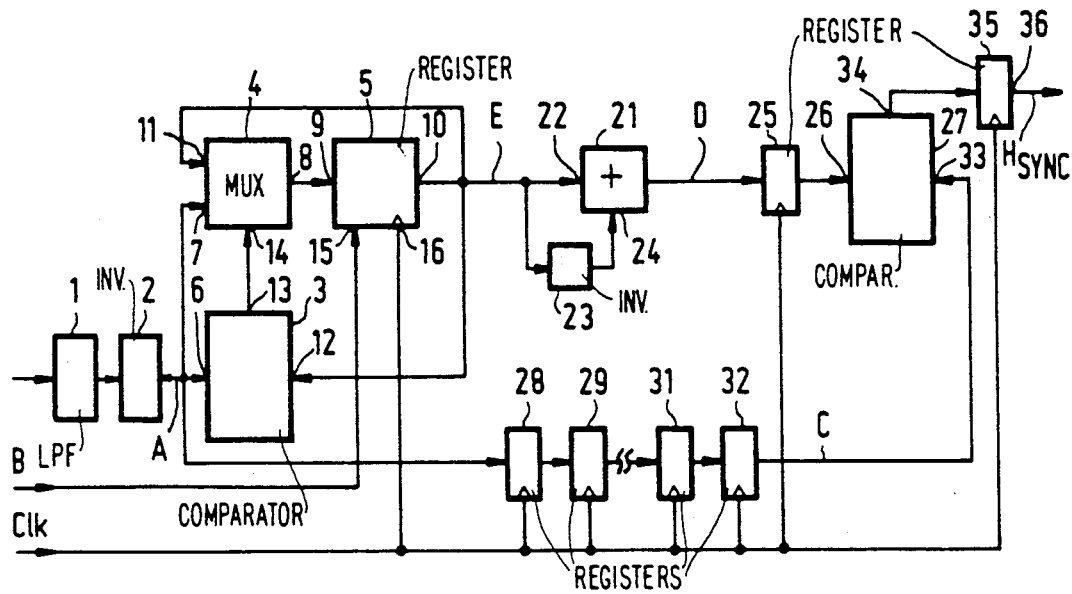
FIG. 1 is a basic circuit diagram of a digital circuit arrangement for detecting horizontal synchronising pulses.

FIG. 1 shows a digital circuit arrangement for detecting horizontal synchronising pulses contained in a digital video signal. The actual circuit arrangement for detection is preceded by a low-pass filter 1 and an inverter 2. A video signal comprising synchronising pulses is applied to the low-pass filter 1. The filtered video signal is inverted in the inverter 2. The filtered and inverted video signal is then applied to a level detector, which forms a part of the digital circuit arrangement for detecting the synchronising pulses. The level detector comprises a comparator 3, a multiplexer 4 and a register 5. The output signal of the inverter 2, i.e. the filtered inverted video signal, is applied to a first input 6 of the comparator 3. The same signal is also applied to a first input 7 of the multiplexer 4. An output 8 of the multiplexer 4 is connected to an input 9 of the register 5, whose output 10 is connected to a second input 11 of the multiplexer 4 and to a second input 12 of the comparator 3. A switching signal, which is present at an output 13 of the comparator 3, is applied to a switching input 14 of the multiplexer 4. A switching signal B, used for resetting the register 5, is applied to an input 15 of the register. A clock signal Clk representing the sample clock of the digital video signal is applied to an input 16 of the register 5.

The signal which is present at the output 10 of the register 5 is also applied to a first input 22 of an adder 21. This signal, which represents a digital video signal with a plurality of bits, is applied with some of the more significant bits to an inverter 23, whose output signal is applied to a second input 24 of the adder 21. The other bits are located at a fixed level at the input 24 so that an amount is subtracted from the extreme value signal appearing at the output 10 of the register 5 by means of the adder 21 and the inverter 23. If, for example, the 12 most significant bits of a 16-bit signal are inverted by means of the inverter 23 and applied to the second input of the adder 24, and if the other four least significant bits are given a high level at the input 24 of the inverter, the output signal of the adder 21 is reduced by 1/16 with respect to its input signal.

The adder 21 is followed by a register 25 which is clocked by means of the clock signal Clk. The output signal of the register 25 is applied to a first input 26 of a comparator 27.

The filtered, inverted digital video signal appearing at the output of the inverter 2 is applied to a register chain comprising a plurality of series-arranged registers 28, 29, 31 and 32. The output signal of the last of these registers is applied to a second input 33 of the comparator 27. The comparison signal, which is supplied by the register 25, and the video signal, which is delayed by means of the register chain 28, 29, 31 and 32, is compared in the comparator 27. In FIG. 1 only four registers 28 to 32 have been shown by way of example for reasons of space, but in an actual apparatus there are 10 to 30, advantageously approximately twenty registers so that the video signal is delayed by twenty sample clocks for the level comparison in the comparator 27 between the comparison signal and the delayed video signal.

The comparison signal appears at an output 34 of the comparator 27. This signal is applied to a register 35 which is also clocked by means of the sample clock Clk. The synchronising signal synchronised at the sample clock appears at the output 36 of the register 35, which signal may be applied, for example, to a phase control circuit, which is not shown in FIG. 1.

The operation of the circuit arrangement shown in FIG. 1 will hereinafter be described in greater detail with reference to some signals appearing in this circuit arrangement and shown in FIG. 2 as a function of time. The time scale of the representation of the signals is chosen to be such that only horizontal synchronising pulses but no vertical synchronising pulses occur in the television signal.

Figure 2:
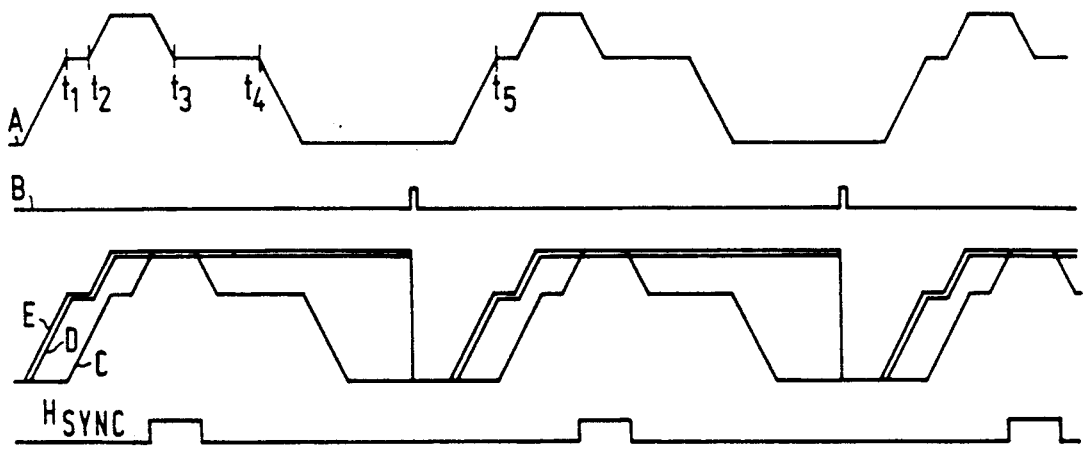
FIG. 2 shows the variation with respect to time of different signals in the circuit arrangement of FIG. 1.

The curve A shown in FIG. 2 represents the signal appearing at the output of the inverter 2. This video signal is actually a digital signal and is shown in FIG. 2 in an analog form for reasons of convenience of the representation. Since the signal is inverted, the horizontal synchronising pulses appear as maximum values in the signal waveform. The time period t1 to t4 as a function of time in FIG. 2 represents a blanking interval in which a horizontal synchronising signal appears in the period between t2 and t3. The period between t4 and t5 is the active period of the video signal, i.e. the period in which the picture information is transmitted. In the example shown in FIG. 2 the picture information is a trapezoidal shaped luminance signal.

In the level detector comprising the comparator 3, the multiplexer 4 and the register 5 the signal represented by the curve A is checked on its maximum values. To this end the signal is applied to the comparator 3 which compares this signal with the output signal of the register 5. Dependent on whether its output signal or the video signal which is just present is larger, the register 5 is charged either with the video signal or with its output signal. This is effected in such a way that the register 5 is only charged with a new value of the video signal which is just present if this signal has a larger value than the signal which was the last to be stored in the register 5. The contents of register 5 are thus continuously brought to the maximum value of the video signal which has occurred so far. By means of the signal B, which produces a pulse that appears each time shortly before the start of the blanking intervals, the register 5 is reset to zero at the start of each time interval so that the measurement and storage of the maximum values is started again. The signal B may be derived from a subsequently arranged digital phase control circuit, which is not shown in FIG. 1.

The output signal of the level detector represents the extreme value signal which in this case represents a maximum value signal because the inverted video signal is checked. This signal is shown in FIG. 2 by mens of the curve E.

In FIG. 2 the signal E follows the inverted video signal A at the start of the curve until the occurrence of the maximum value of the first horizontal synchronising pulse because the level of the video signal increases up to that instant or remains constant, but does not decrease. This is effected in such a way that the comparator supplies a switching signal, which is applied to the switching input 14 of the multiplexer 4, during the periods when the video signal which is present at the first input 6 of the comparator is larger than the output signal of the register 5 and which is present at its second input 12. During these periods the multiplexer 4 is connected by its first input 7 and new values of the video signal are continuously fed into the register 5. During the periods when the signal is constant, the two values which are present at the inputs 6 and 12 of the comparator are equal and the multiplexer 4 is connected by its second input 11 so that the memory contents of the register 5 are constantly read in this register.

At the start of the rear edge of the first horizontal synchronising pulse the signal which then is present at the input 6 of the multiplexer assumes smaller values than the signal stored in the register 5 and present at the input 12 of the comparator. In this case the multiplexer 4 remains connected by its second input 11 so that the memory contents of the register are constantly read again. The register thus remains at the existing maximum value of the current time interval. In the example shown in FIG. 2, this value of the register 5 is maintained until the register 5 is reset by means of the signal B. A new time interval starts at this instant. The process described for the first blanking interval then is repeated.

FIG. 2 also shows a signal D which represents the comparison signal. The signals D and E, similarly to the signals A and C, are digital signals which for the sake of convenience are shown in an analog form in the Figure. The comparison signal is supplied by the adder 21 in the circuit arrangement shown in FIG. 1. This comparison signal is the extreme value signal E which is reduced by a given amount.

In the circuit arrangement shown in FIG. 1, this signal, which is synchronised at the sample clock by means of the register 25, is compared in the comparator 27 with the delayed video signal which is applied to the input 33 of the comparator 27. In FIG. 2 this delayed video signal is shown by means of the curve C. The comparator 27 supplies an output signal during those periods in which the delayed video signal applied to its input 33 has a higher level than the comparison signal applied to its first input 26. This output signal of the comparator 27 is synchronised at the sample clock by means of the register 35. This synchronised signal is shown as the $H_{sync}$ signal in FIG. 2. This signal represents the synchronising signal by means of which subsequent circuit arrangements are synchronised at the horizontal frequency of the video signal which is present. Generally a phase control circuit will be following.

The curves in FIG. 2 show that the extreme values of the video signal are individually determined for each time interval so that levels of the horizontal synchronising pulses possibly fluctuating from picture line to picture line do not disturb their detection.

Furthermore, it is clear that a further disturbance which might occur in a blanking interval after the actual horizontal synchronising pulse would not lead to an erroneous synchronising signal, as long as this disturbance does not have a higher level than the synchronising pulse itself.

It will also be clear that the described arrangement is also suitable for detecting vertical synchronising pulses contained in the incoming video signal.

I claim:

1. A digital circuit arrangement for detecting horizontal or vertical synchronising pulses in a digital video signal, comprising: means for applying the video signal to a level detector which supplies an extreme value signal which continuously provides that extreme value of the video signal which has hitherto occurred in a time interval whose duration corresponds to the time period between two consecutive synchronising pulses, which extreme value indicates the level of the synchronising pulse at the end of the time interval, means for starting a new time interval between consecutive synchronising pulses at a predetermined instant outside of the blanking interval, means for generating a comparison signal by a continuous reduction of the extreme value signal by a predetermined amount, and means for applying said comparison signal to a comparator which supplies a synchronising signal during those periods when the level of the video signal, delayed by several sample values, is higher than the level of the comparison signal.

2. A digital circuit arrangement as claimed in claim 1, wherein the level detector is preceded by a low-pass filter.

3. A digital circuit arrangement as claimed in claim 2, wherein the predetermined amount by which the extreme value signal is reduced to obtain the comparison signal is in the range of $\frac{1}{8}$ to 1/32.

4. A digital circuit arrangement as claimed in any one of claims 1 to 3, wherein the interval starting means starts the time intervals each time during the active period of the video signal, comprising the picture contents, of each picture line.

5. A digital circuit arrangement as claimed in any one of claims 1 to 3 wherein the starting means which start the time intervals includes a counter which is part of a digital phase control circuit coupled to the digital circuit arrangement.

6. A digital circuit arrangement as claimed in any one of claims 1 to 3 further comprising signal delay means which supply said delayed video signal to the comparator such that the delayed video signal applied to the comparator is delayed by 10 to 30 sample clocks of the video signal.

7. A digital circuit arrangement as claimed in any one of claims 1 to 3 wherein the level detector comprises a register clocked with the sample clock of the video signal and at each sample clock being charged with a new sample value of the video signal provided said new value is higher than the sample value last stored in the register, and a further comparator which compares the levels of the last stored sample value in the register and the new sample value of the video signal.

8. A digital circuit arrangement as claimed in claim 1 wherein said predetermined amount is preferably 1/16.

9. A digital circuit arrangement as claimed in claim 1 wherein the digital video signal includes a blanking interval and the interval starting means starts the time intervals at a given instant of time outside of the blanking interval, and wherein the delayed video signal is delayed by approximately 20 sample clock periods of the video signal.

10. A digital circuit arrangement as claimed in claim 7 wherein the interval starting means starts the time intervals at a given instant of time outside of the blanking interval.

11. A digital circuit for detecting synchronizing pulses in a TV digital video signal have a blanking interval, said circuit comprising:

a first input terminal for said video signal,
a second input terminal for a clock signal,
a level detector coupled to said first and second input terminals and responsive to the signals thereat to provide at its output a maximum value signal indicative of the maximum value of the video signal which occurred in a prior time interval of a duration corresponding to a time period between two consecutive synchronizing pulses, said maximum value signal indicating the synchronizing pulse level during said time interval,
means coupled to said level detector for periodically starting a new time interval at a given instant between two consecutive synchronizing pulses which instant occurs outside of the blanking interval,
time delay means coupled to said first input terminal for producing a delayed video signal,
means responsive to the maximum value signal at the output of the level detector for deriving a comparison signal corresponding to a reduced value of the maximum value signal, and
means for comparing the comparison signal and the delayed video signal to produce synchronizing pulses when the level of the delayed video signal exceeds the level of the comparison signal.

12. A digital circuit as claimed in claim 11 wherein the level detector comprises:

a storage device responsive to the video signal at the first input terminal and to the clock signal at the second input terminal for storing new sample values of the video signal, and
a comparator having first and second inputs coupled to said first input terminal and to an output of the storage device for comparing the levels of a prior last maximum value of the video signal stored in the storage device and a new maximum value of the video signal thereby to control the storage device to store said new maximum value when the new maximum value of the video signal exceeds said prior last stored maximum value in the storage device.

13. A digital circuit as claimed in claim 12 wherein the storage device comprises a register having a first input coupled to the second input terminal and a second input coupled to a further input terminal for a switching signal which provides said means for periodically starting a new time interval.

14. A digital circuit as claimed in claim 11 wherein the interval starting means starts the time intervals at a given instant of time during an active period of the video signal and said comparison signal is reduced by an amount in the range of ⅛ to 1/32 of said maximum value signal.

* * * * *